(12) United States Patent
Graeff

(10) Patent No.: US 6,951,065 B2
(45) Date of Patent: Oct. 4, 2005

(54) METHOD AND APPARATUS FOR CONTROLLING GAS FLOW THROUGH GRANULATE IN DRYING HOPPERS

(76) Inventor: Roderich W. Graeff, 102 Savage Farm Dr., Ithaca, NY (US) 14850-6500

( * ) Notice: Subject to any disclaimer, the term of this patent is extended or adjusted under 35 U.S.C. 154(b) by 11 days.

(21) Appl. No.: 10/973,753

(22) Filed: Oct. 26, 2004

(65) Prior Publication Data

US 2005/0091872 A1    May 5, 2005

(51) Int. Cl.[7] .............................................. F26B 3/08
(52) U.S. Cl. .......................... 34/364; 34/550; 34/570; 34/571; 34/491
(58) Field of Search .......................... 34/359, 360, 364, 34/549, 550, 565, 569, 570, 571, 487, 491

(56) References Cited

U.S. PATENT DOCUMENTS

| | | | |
|---|---|---|---|
| 4,300,879 A * | 11/1981 | Goldmann et al. ........... | 432/14 |
| 4,413,426 A | 11/1983 | Graeff ........................... | 34/27 |
| 4,509,272 A | 4/1985 | Graeff ........................... | 34/27 |
| 5,019,994 A * | 5/1991 | Rainville ...................... | 34/484 |
| 5,509,216 A * | 4/1996 | Becker et al. ................. | 34/219 |
| 5,555,636 A * | 9/1996 | Kramer et al. ................. | 34/86 |
| 5,659,974 A | 8/1997 | Graeff ........................... | 34/378 |
| 5,688,305 A | 11/1997 | Graeff ........................... | 95/14 |
| 6,233,842 B1 * | 5/2001 | Geelen .......................... | 34/360 |
| 6,449,875 B1 * | 9/2002 | Becker et al. ................. | 34/491 |

* cited by examiner

*Primary Examiner*—Jiping Lu
(74) *Attorney, Agent, or Firm*—Brown & Michaels, PC

(57) ABSTRACT

Method and apparatus for drying granulate material in a hopper by controlling the amount of gas which flows through the hopper to heat and to dry the granulate. The control allows to use a minimum amount of gas for heating the granulate to the drying temperature and to dry it with an optimal low energy consumption. This effect is reached by controlling the amount of gas flowing through the drying hopper as a function of the temperature difference between the temperature of the heating gas leaving the drying hopper and the granulate to be heated.

21 Claims, 2 Drawing Sheets

METHOD AND APPARATUS FOR CONTROLLING GAS FLOW THROUGH GRANULATE IN DRYING HOPPERS

BACKGROUND OF THE INVENTION

1. Field of the Invention

The invention pertains to the field of gas flow control. More particularly, the invention pertains to control of gas flow in drying hoppers.

2. Description of Related Art

Especially when heating and drying granulates in drying hoppers where the granulate is continually taken out at the bottom with a desired temperature and the granulate to be dried is added batch wise at the top of the hopper, it is very difficult to reach an optimal gas throughput. Therefore it is common to choose a gas flow much too high just to be sure that all of the granulate gets really heated to the desired final temperature. This results in great losses of energy.

If the gas flow is unnecessarily large additional losses of energy are encountered when the return gas coming from the drying hopper flows through a drier for the elimination of its moisture content and from there after being reheated to the drying temperature in a closed circuit back to the bottom of the drying hopper. This is because dryers working on the principle of cooling or adsorption can deliver a low dew point of the dried air in an economical way only whenever the return air to be dried has a low enough temperature. In order to guarantee such a low temperature of the return air especially under changing drying conditions special cooling aggregates are installed in the ducting of the return air. This results in high installation costs and a continuous loss of energy through the cooling of the return air and its following reheating.

A similar process to the present invention was described in the present inventor's 1981 German patent application 3131471 and corresponding U.S. Pat. No. 4,413,426, issued in 1983 and entitled "Method and apparatus for drying moist exhaust air from one or more bulk material drying hoppers". In these patents the amount of airflow is reduced when the return air temperature increases, and reduced with sinking return air temperature. In accordance with claim 5 of the German patent this control shall ensure that the return temperature remains always above the room temperature.

Sadly it appeared that this process does not function well or not at all under a number of drying conditions. This happens when the granulate to be dried has a temperature which is above room temperature whenever the granulate is added at the top of the drying hopper. This happens easily when the room temperature falls during the drying operation or when warm granulate shall be dried.

Under these conditions following the process of U.S. Pat. No. 4,413,426, the amount of airflow would be reduced and therefore would not be any more sufficient to dry the granulate. At the same time it can happen that the granulate to be dried has a temperature quite a bit lower than room temperature for instance when granulate is taken out during the winter from an outdoor silo. In such a case the gas flow would be unnecessarily high. The drying would take place successfully but it would be performed with an unnecessarily high energy consumption.

Adsorption dryers like those described in the present inventor's 1997 U.S. Pat. No. 5,659,974, "Method for regeneration of an adsorbent material containing moisture and apparatus therefor" or U.S. Pat. No. 5,688,305 "Method and Device for drying of moist gases", consist of one or more chambers filled with adsorption material which cyclically dry the return air stream and then are regenerated by an secondary air stream, mostly highly heated room air. As described in FIG. 3, the adsorption material can be arranged on a rotor or a honeycomb material, which cyclical is moved through a dry air adsorption and a regeneration zone.

SUMMARY OF THE INVENTION

The invention describes a process for controlling the amount of gas, which flows through granulate in order to heat and to dry it, and an apparatus for carrying out the process. The control shall allow to reach the minimum of gas flow which is sufficient to heat the granulate to the desired temperature and to dry it with an optimal low energy consumption. The invention insures that the return air flows through the adsorption drier always with an optimal low temperature without the necessity for cooling.

The basis for this invention is the recognition that an optimal control of the amount of drying air is only possible when it is based on a temperature difference, namely the difference of the return air leaving the drying hopper and the temperature of the granulate which is added to the top of the hopper. Whenever this temperature difference is kept very small to just a few centigrade with the return air temperature warmer than the temperature of the granulate to be dried, than this results in the lowest temperature of the return air which guaranties perfect heating and drying with an optimal low energy consumption. In addition, if the return air is conducted in a circuit through a dryer to eliminate its moisture content than this low temperature of the return air results in a good dew point of the dry air with optimal low energy consumption.

For determining the temperature difference a temperature sensor is provided in the duct of the return air leaving the drying hopper and a second one in the granulate which will be conveyed into the drying hopper, for instance in the hopper of the conveyer which is typically mounted on top of the drying hopper, in a storage bin or a silo, from which the granulate is conveyed to the drying hopper. A control device determines the temperature difference of these two sensors and controls the amount of drying air flowing through the drying hopper. This can take place in a well known manner by changing the rotation speed of the dry air blower, by a flapper valve arranged in the duct of the air stream leading to or from the drying hopper, or by a flapper valve in a special duct arranged parallel to the air blower.

In an additional advantageous arrangement in accordance with the invention the use of a second temperature sensor can be avoided. This is based on the realization that the temperature of the return air fluctuates widely. Whenever heated granulate is continuously taken out of the bottom of the drying hopper and replenished by the batch wise addition of granulate to be heated at the top of the hopper, the temperature of the return air falls off for a short time quite strongly when granulate is being added, practically to the temperature of the just added granulate. Then the granulate gets slowly heated and then the temperature of the return air slowly rises until the maximum return air temperature is reached directly before the addition of the next batch of granulate, as shown FIG. 1. A control device can monitor continuously the return temperature. In accordance with the invention the difference of the return air temperature just before the addition of granulate to be dried and directly following the addition can now be used as the value controlling the amount of heating air. As an optimum the temperature maximum before the addition is compared with the minimum after the addition.

The invention is used for the heating and drying of any type of granulates, especially hygroscopic plastic granulates. These granulates to be dried are typically added batchwise in small amounts of, for instance, 2–10 Kg whenever the top level inside the drying hopper has fallen to a minimal height. The dried granulate is taken out at a constant rate at the bottom of the drying hopper and conveyed to the fabricating machines like an extruder or an injection moulding machine.

The invention can be used in combination of drying hoppers with any type of dryers like dryers based on refrigeration, compressed air or adsorption materials.

DETAILED DESCRIPTION OF THE INVENTION

In the following description and the drawings, equivalent parts show the same reference numbers.

Figure 1:
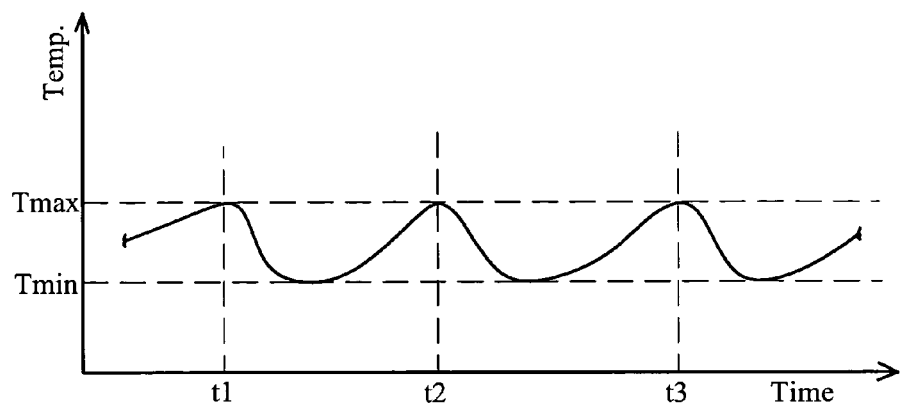
FIG. 1 shows a graph of the temperature of the return air over time

FIG. 1 shows the changing temperature of the return air over time. At the times 1, 2 and 3 a batch of granulate was added at the top of the drying hopper. In consequence of this the temperature of the return air falls to a minimum, which practically corresponds to the temperature of the added granulate. Then the temperature slowly increases following the slow heating of the added granulate up to a maximum when new granulate is added once again.

Figure 2:
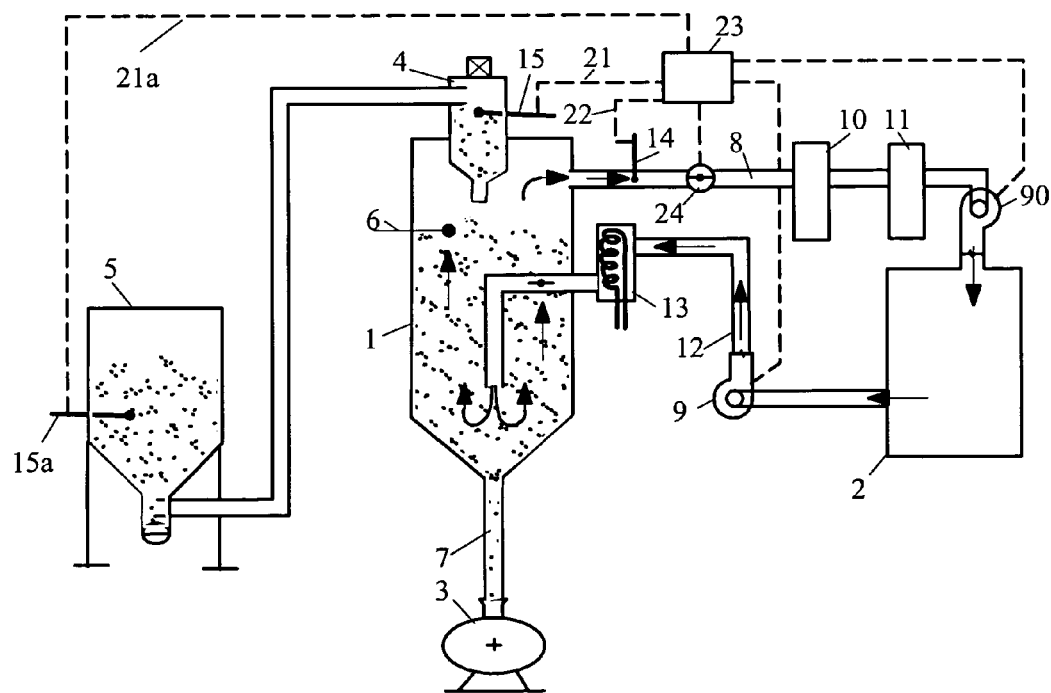
FIG. 2 shows a block diagram of the system of the invention.

FIG. 2 shows a dryer (2), representing an adsorption or refrigeration dryer. The granulate hopper (1) has a conveyer unit (4) at the top which sucks granulate out of granulate container (5) and lets it drop into granulate hopper (1) whenever level sensor (6) demands it. Dried granulate leaves the granulate hopper via duct (7) to a fabricating machine (3).

Return air leaves the hopper (1) via duct (8), sucked by blower (9) through filter (10), cooler (11) and dryer (2). Dry air from the dryer (2) flows via duct (12) through heater (13), where it is typically heated to 60–200° C., and is introduced into the lower part of the drying hopper (1). The dry air now flows from the lower part of the hopper (1) to the upper part of the hopper through the slowly descending granulate. In this passage, the air heats and dries the granulate. Finally, the air leaves the hopper as relatively cool return air through duct (8).

A return air temperature sensor (14) for measuring the temperature of the return air is located in the return air duct (8) just behind the hopper (1). A granulate temperature sensor (15) for measuring the granulate temperature is located inside the conveying unit (4), or, alternatively may be located (15a) in the granulate container (5). Both sensors are connected through the lines (21) (or (21a)) and (22) to control device (23), which alternatively controls flapper valve (24), which is located in duct (8), or the rotation speed of dry air blower (9).

An additional advantageous step is possible with this invention when used with adsorption dryers. These dryers use as adsorption material molecular sieves which have the advantage that they can adsorb moisture even when the temperature of the return air is comparatively high, i.e. 50–70° C. But this adsorption material is expensive and needs a very high regeneration temperature of about 200° C. A low return temperature as reached with this invention allows the use of silica gel as adsorption material. This material is lower in cost and needs a regeneration temperature of only about 120° C. resulting in great energy savings.

When using silica gel it is advantageous to arrange the blower in accordance with FIG. 2, where blower 9 sucks the return air through line 8 and dryer 2 containing the adsorption material. In this arrangement the heat generated in the blower does not increase the temperature of the return air. But it is a disadvantage that the adsorption material is held under a lower pressure than the surrounding room air which would allow moist room air to enter into the just dried air stream through any leak.

Therefore in accordance with the invention a second blower 90 can be arranged in line 8 before the return air stream enters the dryer 2. Blower 9 is controlled by controller (23) to control the volume of air flow for heating and drying in accordance with the invention, while blower 90 is controlled by controller (23) to regulate the air pressure in the line between blowers 90 and 9. Preferably, this regulated pressure is slightly higher than the surrounding room air, making the leakage of room air into the dry air impossible. As the blower 90 can be a very small blower the heat input from this blower is much reduced when comparing it to the single blower 9 as shown in FIG. 3.

Figure 3:
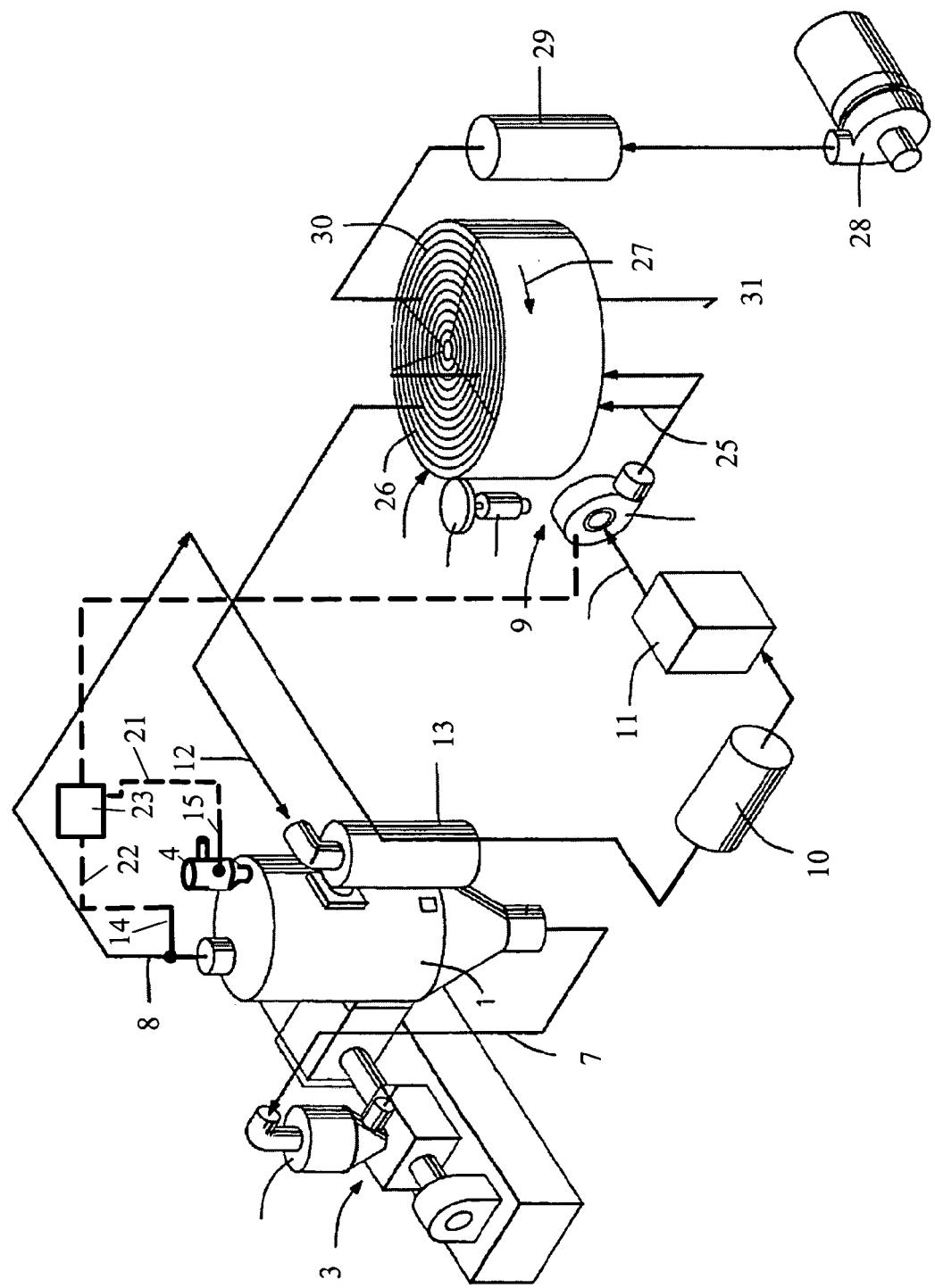
FIG. 3 shows another embodiment of the invention, using a rotor and dessicant.

The adsorption dryer embodiment shown in FIG. 3 uses a honeycomb rotor containing the adsorption medium, a system similar to the one shown in U.S. Pat. No. 5,688,305, which is incorporated herein by reference. The elements which are common with the embodiment of FIG. 2 have the same reference numbers, and will not be separately discussed here.

Blower (9) sucks return air through duct (8) and blows it through duct (25), and through section (26) of slowly rotating rotor (27), where the return air is being dried.

A regeneration blower (28) blows room air through heater (29) and through segment (30) of the rotor (27) where the regeneration takes place. The moist regeneration air leaves segment (30) through the duct (31).

In the above description and in the patent claims the term "air" can mean any type of gas, for instance nitrogen, which might be used preferentially in many cases depending on the type of granulate to be dried. The invention applies not just to adsorption dryers but also equally to refrigeration dryers, where room air or in a circuit conveyed return air is liberated from its moisture content.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of heating granulates in drying devices comprising the steps of:
    a) introducing granulate to be heated into an upper part of a hopper;
    b) passing a volume of heated gas through the granulate in the hopper, the gas being introduced into the hopper in a lower part and leaving the upper part of the hopper as return gas;
    c) withdrawing heated granulate from a bottom of the hopper;
    d) determining a temperature difference between the temperature of the return gas and the temperature of the granulate to be heated; and e) controlling the volume of gas flowing through the granulate as a function of the temperature difference.

2. The method of claim 1 in which the granulate is a plastic granulate.

3. The method of claim 1 in which the volume of gas is controlled in step (e) such that the flow volume is in inverse relationship to the temperature difference.

4. The method of claim 1, further comprising the steps of
f) removing moisture from the return gas;
g) heating the return gas; and
h) returning the gas to the hopper as the heated gas of step (b), such that the gas is recirculated in a closed circuit.

5. The method of claim 4 in which removing the moisture in step (f) is done by passing the gas through a chamber filled with an adsorbent, and further comprising the step of regenerating the adsorbent from time to time by a secondary air circuit.

6. The method of claim 4, further comprising the step of regulating gas pressure in step (f).

7. The method of claim 6, in which the volume of gas flow is controlled in step (e) by changing a rotation speed of a blower and the gas pressure in step (f) is regulated by changing a rotation speed of a different blower.

8. The method of claim 1 in which the volume of gas flow is controlled by changing a rotation speed of a blower.

9. The method of claim 1 in which the volume of gas flow is controlled by changing a flapper valve arranged in ducting through which the gas flows.

10. The method of claim 1 in which there are a plurality of hoppers arranged in parallel, and the volume of gas is independently controlled in each hopper as a function of the temperature difference in that hopper.

11. The method of claim 1 in which the temperature difference is controlled within a few degrees C., with the return gas temperature being greater than the temperature of the granulate.

12. The method of claim 1 in which the step of introducing granulate to be heated is done by introducing a batch of granulate from time to time.

13. The method of claim 12 in which the temperature difference is determined by measuring the temperature of the return gas, and the difference is calculated from a difference between the temperature of the return gas immediately before granulate to be heated is introduced into the hopper and a minimum temperature of the return gas after the introduction of granulate to be heated.

14. The method of claim 1 in which the temperature difference is determined by measuring the temperature of the granulate to be heated and the temperature of the return gas and calculating the difference between the measured temperatures.

15. The method of claim 14 in which the temperature of the granulate to be heated is measured by a sensor located in the hopper at a point of introduction of the granulate.

16. A granulate drying apparatus comprising:
a hopper having an upper part and a lower part, and a granulate withdrawal port at a bottom of the hopper;
a conveying unit for introducing granulate to be heated into the upper part of the hopper;
a gas inlet port located in the lower part of the hopper;
a gas outlet port located in the upper part of the hopper;
a gas blower having an inlet coupled to the gas outlet port and an output coupled to the gas inlet port, such that a volume of gas is passed into the hopper in the lower part and leaves the upper part of the hopper as return gas;
at least one temperature sensor located so as to determine a temperature difference between the temperature of the return gas and the temperature of the granulate to be heated; and
a controller coupled to the gas blower and the temperature sensor, such that the volume of gas flowing through the granulate is controlled as a function of the temperature difference.

17. The drying apparatus of claim 16, further comprising:
a gas dryer for removing moisture from the return gas; and
a heater for heating the gas; such that the gas is dried, heated and recirculated in a closed circuit.

18. The drying apparatus of claim 17, further comprising a second gas blower regulating gas pressure in the gas dryer.

19. The drying apparatus of claim 17 in which the dryer comprises a chamber filled with an adsorbent, and the apparatus further comprises a secondary air circuit for regenerating the adsorbent.

20. The drying apparatus of claim 16 in which the volume of gas flow is controlled by changing a rotation speed of the air blower.

21. The drying apparatus of claim 16 in which the volume of gas flow is controlled by changing a flapper valve arranged in ducting through which the gas flows.

* * * * *

UNITED STATES PATENT AND TRADEMARK OFFICE
CERTIFICATE OF CORRECTION

PATENT NO. : 6,951,065 B2
DATED : October 11, 2005
INVENTOR(S) : Roderich W. Graeff It is certified that error appears in the above-identified patent and that said Letters Patent is hereby corrected as shown below:

<u>Title page,</u>
Insert Item -- [30] Foreign Application Priority Data
Nov. 4, 2003 (DE) 103 52 106.2 --.

Signed and Sealed this

Sixth Day of December, 2005

JON W. DUDAS
*Director of the United States Patent and Trademark Office*